(12) United States Patent
Takizawa

(10) Patent No.: US 12,695,496 B2
(45) Date of Patent: Jul. 28, 2026

(54) COMMUNICATION SYSTEM INCLUDING RELAY IN RESPONSE TO COMMUNICATION REQUEST OCCURRING VIA RELAY STATION, CONTROL APPARATUS, AND COMMUNICATION METHOD

(71) Applicant: TOYOTA JIDOSHA KABUSHIKI KAISHA, Toyota (JP)

(72) Inventor: Kenichi Takizawa, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 18/475,682

(22) Filed: Sep. 27, 2023

(65) Prior Publication Data
US 2024/0106521 A1     Mar. 28, 2024

(30) Foreign Application Priority Data
Sep. 28, 2022     (JP) ................................. 2022-155498

(51) Int. Cl.
*H04W 4/00*         (2018.01)
*H04B 7/15*         (2006.01)
*H04W 72/0446*      (2023.01)

(52) U.S. Cl.
CPC .......... *H04B 7/15* (2013.01); *H04W 72/0446* (2013.01)

(58) Field of Classification Search
CPC ......................... H04W 72/0446; H04W 52/12; H04W 52/255
See application file for complete search history.

(56) References Cited

U.S. PATENT DOCUMENTS

| | | | |
|---|---|---|---|
| 7,720,020 B2 * | 5/2010 | Larsson | H04B 7/022 |
| | | | 455/13.1 |
| 2008/0057973 A1 * | 3/2008 | Park | H04W 40/16 |
| | | | 455/452.2 |
| 2009/0203310 A1 * | 8/2009 | Lozano | H04B 7/155 |
| | | | 455/15 |
| 2009/0227201 A1 | 9/2009 | Imai et al. | |

(Continued)

OTHER PUBLICATIONS

"3GPP TS 38.174 V17.0.0", 3rd Generation Partnership Project, dated Mar. 2022, pp. 1-317.

(Continued)

*Primary Examiner* — Abdelnabi O Musa
(74) *Attorney, Agent, or Firm* — Finnegan, Henderson, Farabow, Garrett and Dunner, LLP

(57)     ABSTRACT
A communication system includes a first communication station, a second communication station, a relay station to relay a communication between the first communication station and the second communication station without changing a timeslot of the communication based on Time Division Multiplexing and a control apparatus. The control apparatus permits the relay station to perform a further communication in response to a communication request occurring in the relay station while relaying the communication, the further communication being directed to a third communication station when the communication to be relayed fulfill a first condition and when the further communication in response to the communication request fulfill a second condition.

19 Claims, 8 Drawing Sheets

(56) References Cited

U.S. PATENT DOCUMENTS

| | | | |
|---|---|---|---|
| 2010/0304665 A1* | 12/2010 | Higuchi ............... | H04B 7/2606 |
| | | | 455/7 |
| 2011/0149769 A1* | 6/2011 | Nagaraja ............... | H04W 52/12 |
| | | | 370/252 |
| 2019/0132804 A1* | 5/2019 | Hong .................... | H04W 52/46 |
| 2024/0039584 A1* | 2/2024 | Duan ................... | H04B 7/0413 |
| 2024/0146391 A1* | 5/2024 | Takizawa ........... | H04B 7/15507 |

OTHER PUBLICATIONS

"3GPP TS 38.106 V17.0.0", 3rd Generation Partnership Project, dated Mar. 2022, pp. 1-77.

* cited by examiner

COMMUNICATION SYSTEM INCLUDING RELAY IN RESPONSE TO COMMUNICATION REQUEST OCCURRING VIA RELAY STATION, CONTROL APPARATUS, AND COMMUNICATION METHOD

CROSS REFERENCE TO THE RELATED APPLICATION

This application claims the benefit of Japanese Patent Application No. 2022-155498, filed on Sep. 28, 2022, which is hereby incorporated by reference herein in its entirety.

BACKGROUND

Technical Field

The present disclosure pertains to a communication system, a control apparatus, and a communication method.

Description of the Related Art

Super low delay communications equal to or shorter than submillimeter seconds are expected in wireless communications exemplified by 5th Generation Mobile Communication System (5G) and equivalences. On the other hand, expansions of cell coverage areas are desired in terms of improving communication systems, and relay communications via relay stations are effective in attaining the expansions. By the way, nonregenerative relay configured not to demodulate and decode at the relay station is desirable as a relay technology exhibiting a small quantity of delay.

PRIOR ART DOCUMENTS

Non-Patent Documents

[Non-Patent Document 1] 3GPP TS 38.174 V17.0.0 (2022 March)
[Non-Patent Document 2] 3GPP TS 38.106 V17.0.0 (2022-March)

SUMMARY

However, a communication request occurs even in a relay station that performs nonregenerative relay in some cases. For example, data desired to be transmitted to a relay destination occur within the relay station, in which case the nonregenerative relay as a relay technology exhibiting a small quantity of delay declines in its advantage when transmitting the data when stopping the nonregenerative relay. Whereas when the relay station does not stop the nonregenerative relay, it is desirable to properly determine whether an additional wireless communication resource for transmitting the data to the relay destination from the relay station is securable in addition to wireless communication resources for executing the nonregenerative relay. An aspect of the embodiment of the disclosure resides in properly processing a communication request occurring within a relay station performing the nonregenerative relay by suppressing a time delay.

One aspect of the embodiment of the disclosure is exemplified by a communication system. A communication system includes: a first communication station; a second communication station; a relay station to relay a communication between the first communication station and the second communication station without changing a timeslot of the communication based on Time Division Multiplexing; and a control apparatus to permit the relay station to perform a further communication in response to a communication request occurring in the relay station while relaying the communication, the further communication being directed to a third communication station when the communication to be relayed fulfill a first condition and when the further communication in response to the communication request fulfill a second condition.

The communication system is enabled to properly process the communication request occurring within the relay station performing the nonregenerative relay by suppressing the time delay.

DESCRIPTION OF THE EMBODIMENTS

Figure 1:
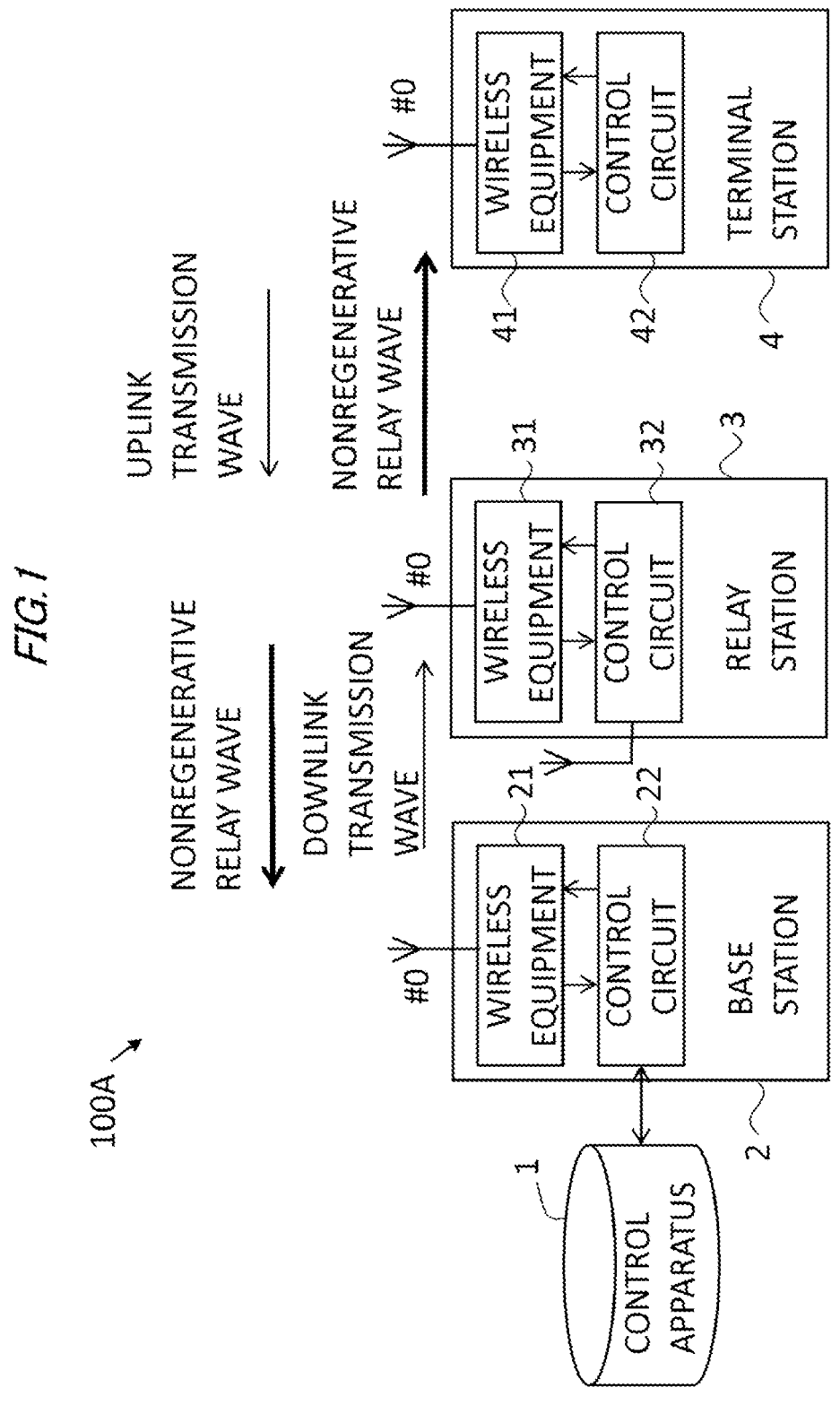
FIG. 1 is a diagram illustrating a communication system according to one embodiment.

A communication system, a control apparatus, and a communication method according to one embodiment will hereinafter be described with reference to the accompanying drawings. The communication system includes: a first communication station; a second communication station; a relay station to relay a communication without changing a timeslot of Time Division Multiplexed communications between the first communication station and the second communication station; and a control apparatus. The control apparatus permits the relay station to perform a further communication in response to a communication request when the communication to be relayed fulfill a first condition and when the further communication in response to the communication request fulfill a second condition upon occurrence of the communication request being directed to the second communication station during the communication relay by the relay station. The communication system is enabled to transmit data to a relay destination in response to the communication request occurring within the relay station without stopping nonregenerative relay or by keeping the relay without shifting the timeslot of the communication to be relayed. The communication system is also enabled to use wireless communication resources at high efficiency.

The first communication station may herein be said to be a transmission station. While on the other hand, the second communication station may be said to be a reception station. The first condition is a condition under which the second communication station serving as the reception station receives the relayed communication sent to the second communication station from the first communication station at a sufficient (reference) signal-to-interference noise power ratio or higher. The second condition may be said to be a condition under which the second communication station serving as the reception station receives the further communication in response to the communication request occurring in the relay station with a sufficient power difference as compared with reception power of the communication sent to the second communication station from the first communication station. The communication system is requested to enable the reception station to receive the communication to be relayed by the relay station with a predetermined communication quality as the first condition. Transmission power usable for the further communication in response to the communication request in the relay station is requested to take a positive value as the second condition, which power is obtained by eliminating the transmission power for relaying the communication from maximum transmission power allowable to the relay station. Further as the second condition, when the communication in response to the communication request are performed with the transmission power taking the positive value, a communication-enabled modulation method and coding rate are requested to exist for a signal-to-interference noise power ratio calculated with respect to the signals received by the second communication station. When the first condition and the second condition are fulfilled, the communication in response to the communication request in the relay station are permitted.

<Embodiment> (System Configuration)

FIG. 1 is a diagram illustrating a communication system 100A according to one embodiment. The communication system 100A includes a control apparatus 1, a base station 2, a relay station 3, and a terminal station 4. The control apparatus 1 is an apparatus on a core network to which the base station 2 is connected. The control apparatus 1 may also be, however, considered to be the core network itself or a system included by the core network. The core network includes, e.g., an optical fiber network. The control apparatus 1 controls the base station 2, the relay station 3 and the terminal station 4, thereby providing communication systems to the terminal station 4.

The base station 2 provides a wireless access network to the terminal station 4. An area enabling wireless communications in the wireless access network is also called a cell. The base station 2 includes one or more antennas (denoted by, e.g., #0), wireless equipment 21 connected to the one or more antennas, and a control circuit 22. The control circuit 22 includes, e.g., a processor and a memory. The processor controls, based on a computer program on the memory, the communications with the control apparatus 1 and wireless communications with the relay station 3 and the terminal station 4.

The terminal station 4 is also called a mobile station. The mobile station connects to the wireless access network within a range of the cell provided by the base station 2. On the other hand, the relay station 3 relays the wireless communication between the base station 2 and the terminal station 4. The relay station 3 may include a station called a fixed station with its installed location being fixed and the mobile station.

The relay station 3 includes, as in the case of the base station 2, the one or more antennas (e.g., #0), wireless equipment 31 connected respectively to the one or more antennas, and a control circuit 32. Note that the control circuit 32 is connected to an antenna dedicated to the control circuit 32 independently of the antennas connected to the wireless equipment 31 as the case may be.

The terminal station 4 includes the one or more antennas (e.g., #0), wireless equipment 41 connected respectively to the one or more antennas, and a control circuit 42. However, the single wireless equipment 41 may also be mounted with a plurality of antennas. For example, the wireless equipment 41 may simply receive reception signals by selecting the antenna exhibiting a highest level of the reception signal. Similarly, the single wireless equipment 31 in the relay station 3 may also be mounted with the plurality of antennas. The mobile station existing in the cell requests the base station 2 to connect with the wireless access network and is thereby connected to the network, whereby the mobile station operates as the terminal station 4. The in-cell mobile station may request the base station 2 to connect directly with the wireless access network. The mobile station may request the base station 2 to connect with the wireless access network via another mobile station operating as the relay station 3 in the cell or via the fixed station outside or within the cell. The terminal station 4 may be said to be a station enabled to communicate with the base station 2 via any of the one or more relay stations 3 or without via any of the one or more relay stations 3. In a downlink channel, the first communication station may be said to be the base station 2, while the second communication station may be said to be the terminal station 4. In an uplink channel, the first communication station may be said to be the terminal station 4, while the second communication station may be said to be the base station 2.

Figure 2:
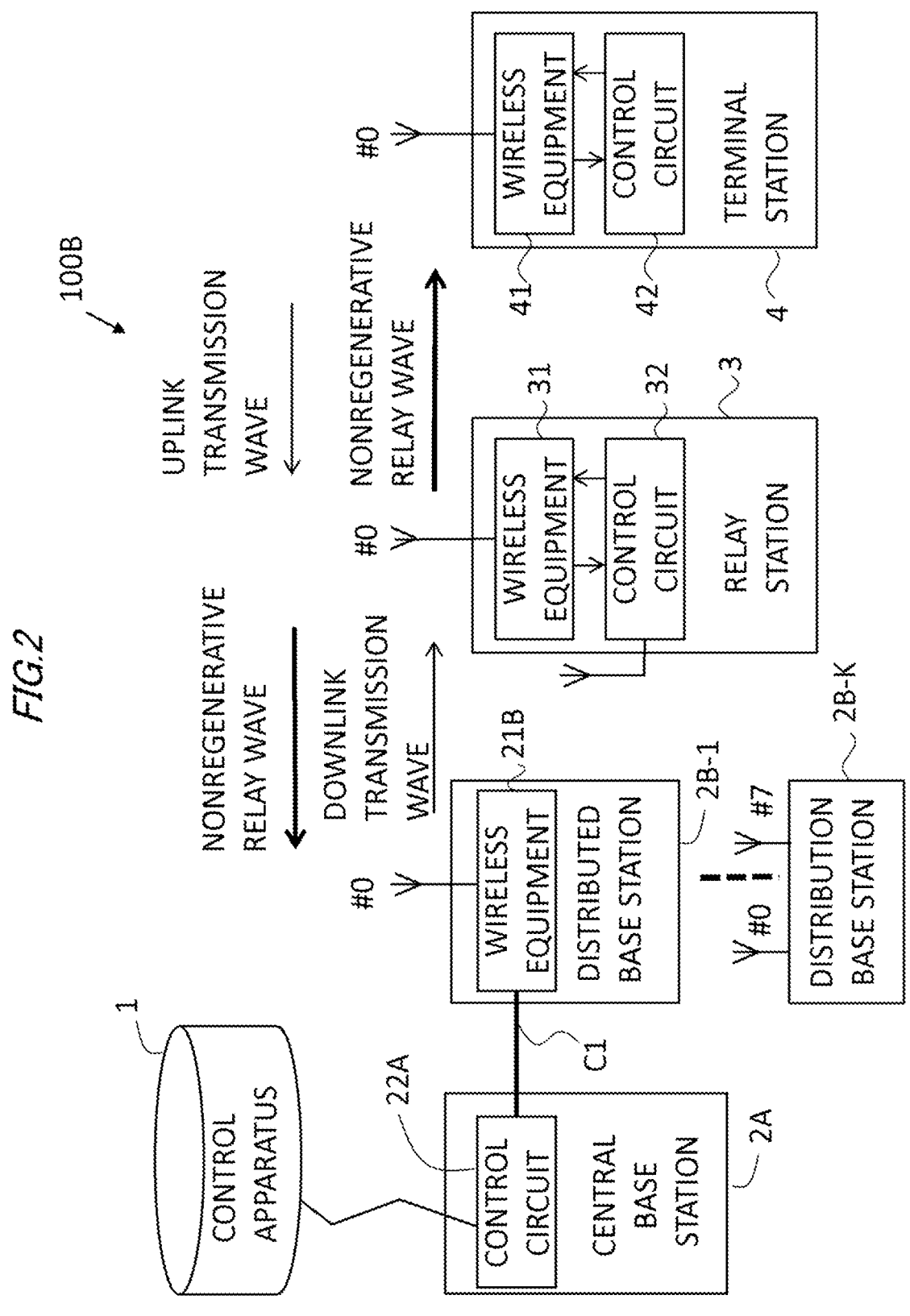
FIG. 2 is a diagram illustrating a communication system by way of another example included in one embodiment.

FIG. 2 is a diagram illustrating a communication system 100B given as another example included in the embodiment. In comparison with the communication system 100A, in FIG. 1, the communication system 100B includes a central base station 2A and one or more distribution base stations 2B in place of the base station 2. The one or more distribution base stations 2B are, when individually distinguished, denoted by branch numbers such as the distribution base stations 2B-1, . . . , 2B-K. Herein, the branch number K is an integer indicating the number of the distribution base stations. FIG. 2 illustrates the distribution base stations 2B-1 and 2B-K. However, the distribution base stations 2B-1, . . . , 2B-K are, when generically named, simply termed the distribution base stations 2B.

The central base station 2A includes a control circuit 22A. The distribution base station 2B includes a wireless equipment 21B. The control circuit 22A of the central base station 2A is connected via, e.g., an optical fiber C1 or the wireless network to the wireless equipment 21B of the distribution base station 2B. A network topology of the optical fibers C1 connecting the central base station 2A to the plurality of distribution base stations 2B, is not limited. For instance, the network topology of the optical fibers C1 may be a point-to-point topology between nodes, a network topology in which the nodes are further distributed as getting farther from the central base station 2A, a star network topology, or a ring network topology. Limited are none of standards and protocols of the wireless networks when the control circuit 22A of the central base station 2A is connected via the wireless network to the wireless equipment 21B of the distribution base station 2B.

The control circuit 22A includes the processor and the memory as in the case of the control circuit 22 in FIG. 1. The processor controls, based on the computer program on the memory, the communications with the control apparatus 1 and the wireless communications with the relay stations 3 and the terminal station 4. To be specific, the control circuit 22A controls the wireless communications with the relay stations 3 and the terminal station 4 via the wireless equipment 21B of the one or more distribution base stations 2B. In the downlink channel, the first communication stations may be said to be the central base station 2A and the distributed base station 2B, while the second communication station may be said to be the terminal station 4. In the uplink channel, the first communication station may be said to be the terminal station 4, while the second communication stations may be said to be the central base station 2A and the distributed base station 2B.

Figure 3:
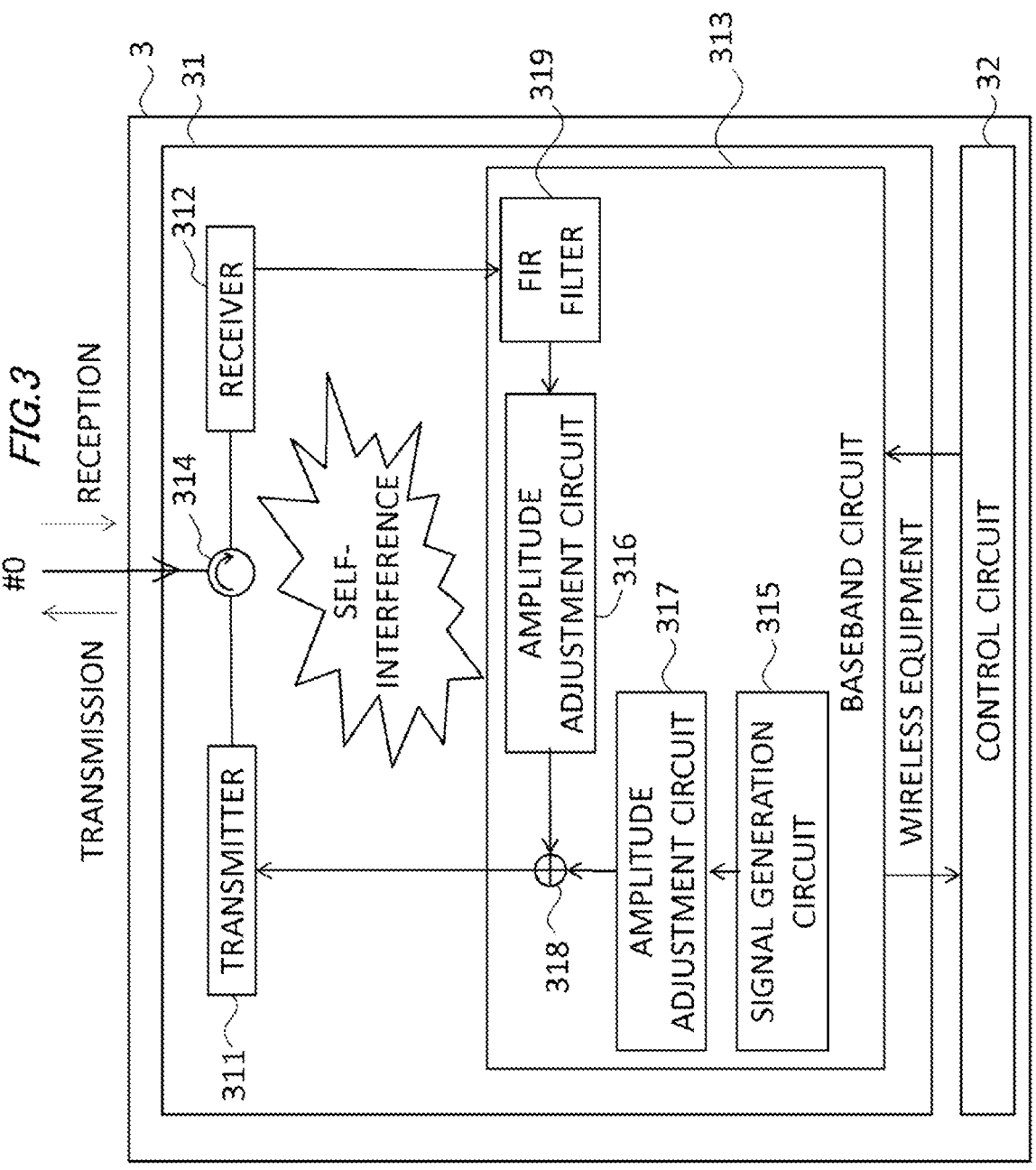
FIG. 3 is a diagram illustrating a configuration of a relay station 3.

FIG. 3 is a diagram illustrating a configuration of the relay station 3. The relay station includes the wireless equipment 31 and the control circuit 32. The wireless equipment 31 of the relay station 3 includes a transmitter 311, a receiver 312, a baseband circuit 313, and a circulator 314. Specifically, the transmitter 311, the receiver 312 and the antenna (#0) are connected to three ports of the circulator 314. A transmission signal from the transmitter 311 is inputted to, e.g., the first port of the circulator 314 and transmitted to the antenna (#0) from the second port. A reception signal received by the antenna (#0) is inputted to the second port of the circulator 314 and transmitted to the receiver 312 from the third port.

Herein, an electric power difference between the transmission signal and the reception signal is, e.g., approximately 100 dB. On the other hand, an isolation of the circulator 314 is approximately 30 dB, and part of the transmission signal causes self-interference with the reception signal. The self-interference is suppressed by using a Radio Frequency (RF) analog filter within the receiver 312 in combination with an FIR filter 319 within the baseband circuit 313.

The receiver 312 receives the reception signal from the antenna (#0) via the circulator 314. The receiver 312 includes an orthogonal detection circuit and an analog-to-digital (AD) converter. The receiver 312, down-converts the reception signal by the orthogonal detection and further converts the down-converted signal into digital data by the AD converter, thus obtaining a baseband signal. The receiver 312 outputs the obtained baseband signal to the baseband circuit 313.

The baseband circuit 313 includes the FIR filter. 319, a signal generation circuit 315, amplitude adjustment circuits 316, 317, and an adder circuit 318. The FIR filter 319 suppresses the transmission signal mixed in the reception signal to cause the self-interference. The amplitude adjustment circuit 316 adjusts an amplitude of the baseband waveform of the reception signal that is filtered by the FIR filter 319. The reception signal having the baseband waveform may be called a relayed signal. The relayed signal is, after being added to a superimposed signal coming from the signal generation circuit 315 by the adder circuit 318, converted into an analog signal by a digital-to-analog (DA) converter of the transmitter 311, then converted into a high-frequency signal, and amplified by a power amplifier. Herein, a relationship is already known, between an amplitude value of the baseband waveform (e.g., a string of complex numbers expressed by a signed integer value) inputted to the DA converter in the transmitter 311 and a power value of the high-frequency signal. For example, a gain of the power amplifier is already known, and, as in the configuration of FIG. 3, the isolation of the isolator is fixed, in which case the receiver is enabled to measure the relationship between the baseband waveform and the power value of the high-frequency signal. Such being the case, the amplitude adjustment circuit 316 adjusts the amplitude of baseband waveform of the relayed signal, whereby the baseband circuit 313 is enabled to adjust transmission power ($P_{R,BS}$) of the high-frequency signal to carry the relayed signal. Consequently, the amplitude adjustment circuit 316 outputs the relayed signal having the amplitude-adjusted baseband waveform to the adder circuit 318.

The signal generation circuit 315 generates, upon an instruction of the control circuit 32, the superimposed signal having the baseband waveform for transmitting the communication request occurring in the relay station 3, i.e., the data to be transmitted to the relay destination from within the relay station. The amplitude adjustment circuit 317 adjusts an amplitude of the baseband waveform of the superimposed signal, which is generated by the signal generation circuit 315. The superimposed signal is, after being synthesized with the relayed signal, converted into the analog signal by the DA converter of the transmitter 311, then converted into the high-frequency signal, and amplified by the power amplifier. As described above, the relationship is already known, between the amplitude value of the DA converter in the transmitter 311 and the power value of the high-frequency signal. Such being the case, the amplitude adjustment circuit 317 adjusts the amplitude of the superimposed signal having the baseband waveform, whereby the baseband circuit 313 is enabled to adjust transmission power ($P_{R,R}$) of the high-frequency superimposed signal. Consequently, the amplitude adjustment circuit 316 outputs the amplitude-adjusted superimposed signal having the baseband waveform to the adder circuit 318.

The adder circuit 318, defined as a circuit to add, e.g., 16-bit signed integer, adds the signal value having the baseband waveform, which is expressed by a real part (real number) and an imaginary part (imaginary number) of the complex number. The adder circuit 318 digitally adds the two signals (the relayed signal and the superimposed signal) to be inputted, thus synthesizing these signals. The relayed signal with its amplitude being adjusted with the baseband waveform is synthesized with the superimposed signal with its amplitude being adjusted with the baseband waveform, and a synthesized signal is outputted to the transmitter 311. In the transmitter 311, the DA converter converts the synthesized signal having the baseband waveform into the analog data, and the modulation circuit converts a frequency (up-convert) of the synthesized signal. The transmitter 311 thereby modulates a high-frequency carrier wave, amplifies the modulated high-frequency signal by the power amplifier, and transmits the amplified signal from the antenna. The relayed signal and the superimposed signal are amplitude-adjusted with the baseband waveform. As stated above, the relationship is already known, between the amplitude value of the DA converter and the power value of the high-frequency signal. Accordingly, the relay station 3 adjusts the amplitudes of the baseband waveforms of the relayed signal and the superimposed signal, and is thereby enabled to control the power $P_{R, BS}$ of the relayed signal and the power $P_{R, R}$ of the superimposed signal, which are transmitted from the antenna.

The transmitter 311 includes a digital-to-analog (DA) converter and a modulation circuit. In the transmitter 311, the DA converter converts the reception signal coming from the baseband circuit 313 into an analog signal, and the modulation circuit generates the high-frequency signal. The high-frequency signal is a signal in which the high-frequency carrier wave is modulated with the synthesized signal coming from the adder circuit 318. The transmitter 311 transmits the high-frequency signal as the relayed signal from the antenna (#0) via the circulator 314.

The control circuit 32 controls the relay station 3 and thus provides a function as the relay station 3. The control circuit 32 controls the communications among, e.g., the control apparatus 1, the base station 2, and the terminal station 4. For instance, the control circuit 32 measures a propagation delay "$\tau_{UE \to R}$" and a propagation characteristic "$H_{UE \to R}$" between the terminal station 4 and the relay station 3. The control circuit 32 sets the FIR filter 319 and sets control parameters of the amplitude adjustment circuits 316, 317. The control circuit 32 inquires the control apparatus 1 about whether a response to the communication request is made when the communication request for the reception station (which is the terminal station 4 on the downlink channel but is the base station 2 on the uplink channel) occurs within the relay station 3.

Figure 4:
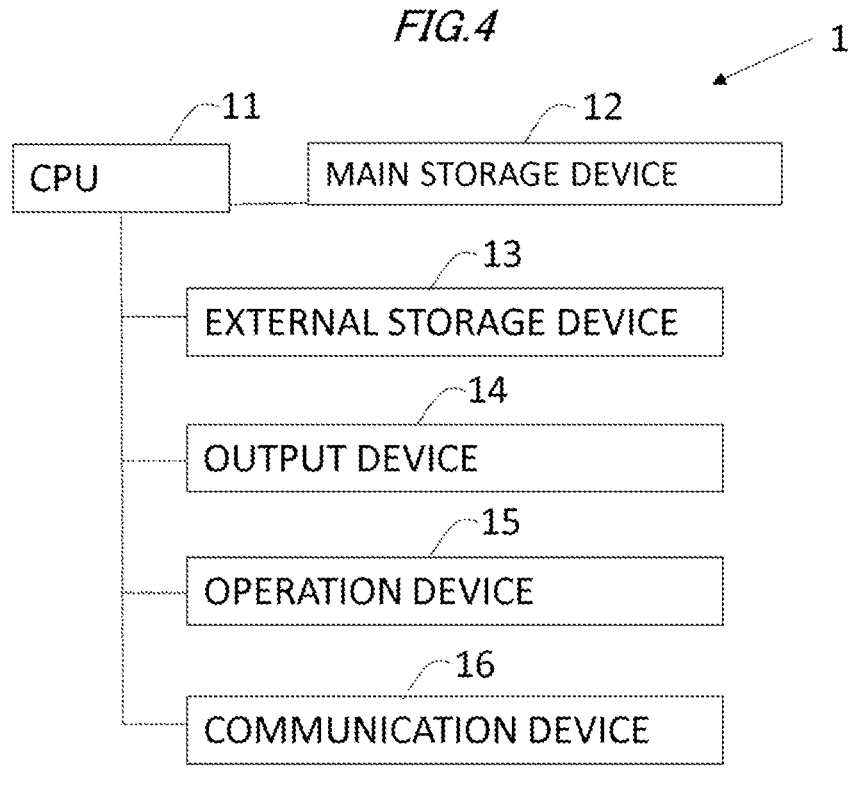
FIG. 4 is a diagram illustrating a hardware configuration of a control apparatus.

FIG. 4 is a diagram illustrating a hardware configuration of the control apparatus 1. The control apparatus 1 includes a CPU 11, a main storage device 12 and external equipment, and executes communication processes and information processes, based on computer programs. The CPU 11 is also called a processor. The CPU 11 may also take a multiprocessor configuration without being limited to a single processor. The CPU 11 may also be configured to include a Graphics Processing Unit (GPU), a Digital Signal Processor (DSP) and other equivalents. The CPU 11 may further be configured to cooperate with a hardware circuit exemplified by a Field Programmable Gate Array (FPGA). The external equipment is exemplified by an external storage device 13, an output device 14, an operation device 15, and a communication device 16.

The CPU 11 executes the computer program deployed in an executable manner on the main storage device 12, and thus provides processes of the control apparatus 1. The main storage device 12 stores the computer programs to be executed by the CPU 11 and data to be processed by the CPU 11. The main storage device 12 is exemplified by a Dynamic Random Access Memory (DRAM), a Static Random Access Memory (SRAM), and a Read Only Memory (ROM). The external storage device 13 is used as, e.g., a storage area auxiliary to the main storage device 12 to thereby store the computer programs to be executed by the CPU 11 and the data to be processed by the CPU 11. The external storage device 13 is exemplified by a Hard Disc Drive (HDD), a Solid State Drive (SSD). The drive device serving as an attachable/detachable storage medium may be connected to the control apparatus 1. The attachable/detachable storage medium is exemplified by a Blu-ray disc, a Digital Versatile Disc (DVD), a Compact Disc (CD), and a flash memory card.

The output device 14 is a display device exemplified by a liquid crystal display, and an electroluminescence panel. The output device 14 may, however, include a loudspeaker and other devices that output voices and sounds. The operation device 15 is exemplified by a touch panel built up by superposing a touch sensor on the display device. The communication device 16 performs the communications with the base station 2 and an external network exemplified by the Internet via the optical fiber. The communication device 16 is, e.g., a gateway connected to the base station 2 and a gateway for the communications with the external network exemplified by the Internet. The communication device 16 may be configured as a single device and may also be configured by combining a plurality of devices.

(Signal Power)

Figure 5:
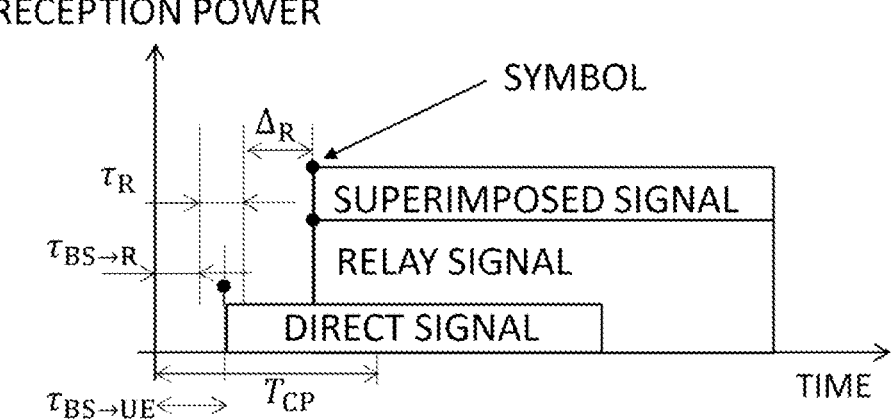
FIG. 5 is a diagram illustrating reception timings and reception power of a reception wave when a terminal station receives a signal transmitted from a base station.

FIG. 5 is a diagram illustrating reception timings and reception power of the reception wave when the terminal station 4 serving as the reception station receives the signal transmitted from the base station 2 as the transmission station. In FIG. 5, an axis of abscissa indicates time till the signal transmitted from the base station 2 reaches the terminal station 4. An axis of ordinate indicates power of the signal received by the terminal station 4. Three solid black circles represent symbols to be transmitted in a single timeslot of the signal. One of the three solid black circles exemplifies the symbol of a direct signal propagated on a direct wave that directly reaches the terminal station 4 from the base station 2. The second circle exemplifies the symbol of the relayed signal propagated on the relay wave to be relayed by the relay station 3. The third circle exemplifies the symbols of the signal corresponding to the transmission request (data) occurring within the relay station 3. In the embodiment, the signal corresponding to the transmission request occurring within the relay station 3 is called the superimposed signal. The high-frequency wave modulated with the superimposed signal is called a superimposed wave. These respective symbols are received by the terminal station 4 within a cyclic prefix interval "Tcp" since being transmitted from the base station 2.

In the example of FIG. 5, the direct wave reaches the terminal station 4 from the base station 2 with a propagation delay quantity "$\tau_{BS \to UE}$". The relay wave reaches the relay station 3 from the base station 2 with a propagation delay quantity "$\tau_{BS \to R}$". The relay wave is nonregenerative-relayed by the relay station 3 with a process delay quantity "$\tau_R$" and is transmitted from the relay station 3. The relay wave reaches the terminal station 4 from the relay station 3 with a propagation delay quantity "$\Delta R$". The superimposed wave, which carries the signal (superimposed signal) of the data occurring within the relay station 3, reaches the terminal station 4 from the relay also with the propagation delay quantity "$\Delta R$".

The control apparatus 1 determines the power when the terminal station 4 as the reception station, e.g., on the downlink channel receives the respective signals having the reception waves, which contain the signal having the direct wave, the relayed signal having the relay wave and the superimposed signal having the superimposed wave so that the signals are separated. The control apparatus 1 determines the transmission power in the base station 2 and the transmission power in the relay station 3 so as to obtain determined reception power of the direct wave, the relay wave and the superimposed wave. The control apparatus 1 determines the transmission power for the relay wave and the superimposed wave respectively in the relay station 3. The control apparatus 1 notifies the base station 2 and the relay station 3 of the determined transmission power. The transmission power is calculated from target reception power in the reception station (terminal station 4) and a propagation loss of a path between the transmission station (base station 2) and the reception station (terminal station 4).

The base station 2 transmits the transmission wave with the notified transmission power. The relay station 3 transmits the relay wave and the superimposed wave with the transmission power notified for the relay wave to carry the relayed signal and the carrier wave to carry the superimposed signal. Note that FIG. 5 illustrates the downlink channel signal to be transmitted to the terminal station 4 from the base station 2. However, the control apparatus 1 likewise processes the uplink channel signals to the base station 2 from the terminal station 4. To be specific, the control apparatus 1 controls the power to obtain the determined reception power of the direct wave, the relay wave and the superimposed wave in the reception station (base station 2). The control apparatus 1 determines the transmission power in the transmission station (terminal station 4) and the transmission power in the relay station 3. The control apparatus 1 determines the transmission power for the relay wave and the superimposed wave respectively in the relay station 3. The control apparatus 1 notifies the terminal station 4 and the relay station 3 of the determined transmission power. The transmission power is calculated from the target reception power in the reception station (base station 2) and from the propagation loss of the path between the transmission station (terminal station 4) and the reception station (base station 2).

Figure 6:
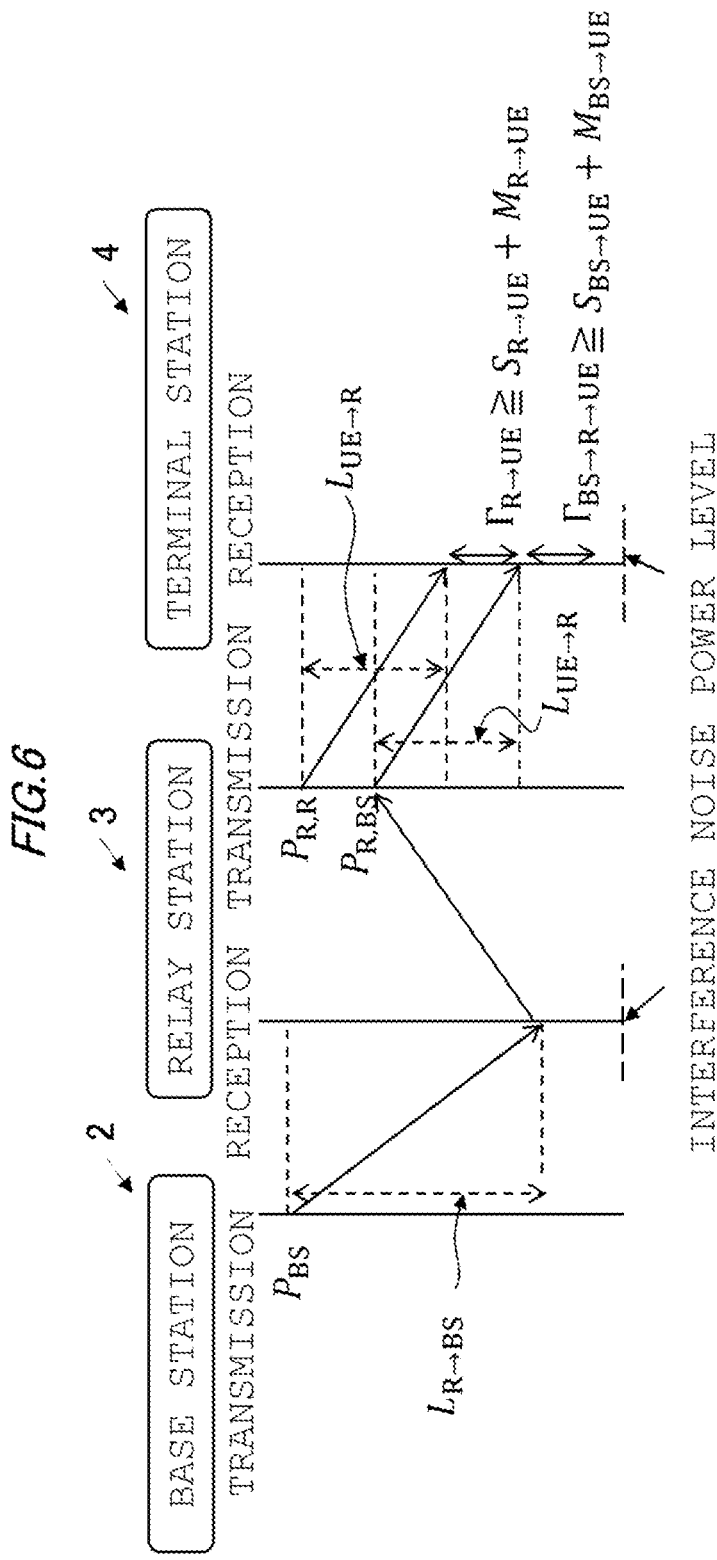
FIG. 6 is a diagram illustrating how signal power changes concurrently with propagation of the relay wave and a superimposed wave.

FIG. 6 is a diagram illustrating how the signal power changes concurrently with the propagation of the relay wave and the superimposed wave. In FIG. 6, the signal transmitted with transmission power "$P_{BS}$" from the transmission side (base station 2) reaches the relay station 3 via the propagation path having an attenuation quantity "$L_{R \to BS}$" defined as the propagation loss. Note that the base station 2 measures the attenuation quantity "$L_{R \to BS}$" from a reference signal on a control channel, which is transmitted from the relay station 3. In FIG. 6, the attenuation quantity "$L_{R \to BS}$" is used as the loss on the propagation path leading to the relay station 3 from the base station 2. The signal reaching the relay station 3 is transmitted with transmission power "$P_{R,BS}$" of the relay wave after being nonregenerative-relayed based on the non-regenerative relay. The transmitted signal reaches the reception station (terminal station 4) via the propagation path with an attenuation quantity "$L_{UE \to R}$" defined as the propagation loss. Hereat, a reception SINR in the reception station (terminal station 4) is denoted by "$\Gamma_{BS \to R \to UE}$". On the other hand, the transmission power of the superimposed wave to be superimposed on the relay wave in the relay station 3 is denoted by "$P_{R,R}$". Conditions given in following (Formula 1) through (Formula 5) are imposed on the transmission power of the relay wave (relayed signals) and the transmission power of the superimposed wave (superimposed signal).

The reception SINR of the relay wave is required to be equal to or larger than an SINR value required for the modulation method and a coding rate (Modulation and channel Coding Scheme (MCS)) of the reception signal. Herein, when the SINR value required for the MCS of the reception signal is given by "$S_{BS \to UE}$", following (Formula 1) is required.

[Mathematical Formula 1]

$$\Gamma_{BS \to R \to UE} \geq S_{BS \to UE} \qquad \text{(Formula 1)}$$

Note that a condition given by adding a margin "$M_{BS \to UE}$" to the condition of (Formula 1) may also be available. In this case, (Formula 2) may be fulfilled in place of (Formula 1).

[Mathematical Formula 2]

$$\Gamma_{BS \to R \to UE} \geq S_{BS \to UE} + M_{BS \to UE} \qquad \text{(Formula 2)}$$

Herein, the condition of (Formula 1) is one example of a first condition. To be specific, the first condition is that the signal-to-interference noise power ratio of the reception signal in the reception station (e.g., terminal station 4) as the second communication station is equal to or larger than a reference signal-to-interference noise power ratio required for the modulation method and the coding rate (MCS) of the reception signal in the communications to be relayed. Next, a total of the transmission power "$P_{R,R}$" of the superimposed wave and the transmission power "$P_{R,BS}$" of the relay wave needs to be within maximum transmission power "$P_{R,max}$" of the relay station 3. Then, (Formula 3) is required.

[Mathematical Formula 3]

$$10 \cdot \log_{10}(10^\wedge(P_{R,R}/10) + 10^\wedge(P_{R,RS}/10)) \leq P_{R,max} \qquad \text{(Formula 3)}$$

where "$10^\wedge x$" represents a power of 10 and is an exponential function with "x" being an exponent. Each of the transmission power "$P_{R,R}$" of the superimposed wave, the transmission power "$P_{R,BS}$", and the maximum transmission power "$P_{R,max}$" is signal power expressed by decibel.

Accordingly, the transmission power "$P_{R,R}$" of the superimposed wave, which fulfills (Formula 3), is required to take a positive value. Herein, "$\Gamma_{R \to UE}$" is the SINR of such a signal that the superimposed wave transmitted with the transmission power "$P_{R,R}$" from the relay station 3 reaches and is received by the reception side (terminal station 4) via the propagation path with an attenuation quantity "$L_{UE \to R}$". Note that the SINR of the reception signal of the superimposed wave (superimposed signal) is a value defined by a base level of "$\Gamma_{BS \to R \to UE}$" defined as the SINR in the reception station (e.g., terminal station 4) of the relay wave (relayed signal). The second condition is that the communication-enabled MCS exists for the SINR, i.e., "$\Gamma_{R \to UE}$" of the superimposed signal. Namely, the reception SINR required by the communication-enabled is set to "$S_{R \to UE}$", in which case (Formula 4) is required.

[Mathematical Formula 4]

$$\Gamma_{R \to UE} \geq S_{R \to UE} \qquad \text{(Formula 4)}$$

However, a condition given by further adding a margin "$M_{R \to UE}$" to the condition of (Formula 4) may also be available. In this case, (Formula 4) may be replaced by (Formula 5).

[Mathematical Formula 5]

$$\Gamma_{R \to UE} \geq S_{R \to UE} + M_{R \to UE} \qquad \text{(Formula 5)}$$

Specifically, the second condition is that the transmission power "$P_{R,R}$" of the superimposed wave in (Formula 3) takes a positive value, and the communication-enabled modulation method and the coding rate (MCS) with the reception SINR ($S_{R \to UE}$) in (Formula 4) or (Formula 5) exist for the superimposed wave.

In FIG. 6, the conditions of (Formula 2) and (Formula 5) are exemplified as the conditions of the reception SINR in the terminal station 4 as the reception station. The control apparatus 1 determines, based on whether the conditions of (Formula 2) and (Formula 5) illustrated in FIG. 6 are fulfilled, a feasibility of occurrence of the superimposed signal in the relay station 3. When the conditions of (Formula 2) and (formula 5) are fulfilled, the control apparatus 1 determines the MCS of the superimposed wave and the transmission power of the superimposed wave. Note that the base station 2 is set as the transmission station, while the terminal station 4 is set as the reception station in FIG. 6; and, however, the same is applied also when the terminal station 4 is set as the transmission station, while the base station 2 is set as the reception station.

The base station 2 as the transmission station on the downlink channel is one example of the first communication station. The terminal station 4 as the reception station on the downlink channel is one example of the second communication station. The terminal station 4 as the transmission station on the uplink channel is one example of the first communication station. The base station 2 as the reception station on the uplink channel is one example of the second communication station.

(Processing Flow)

Figure 7:
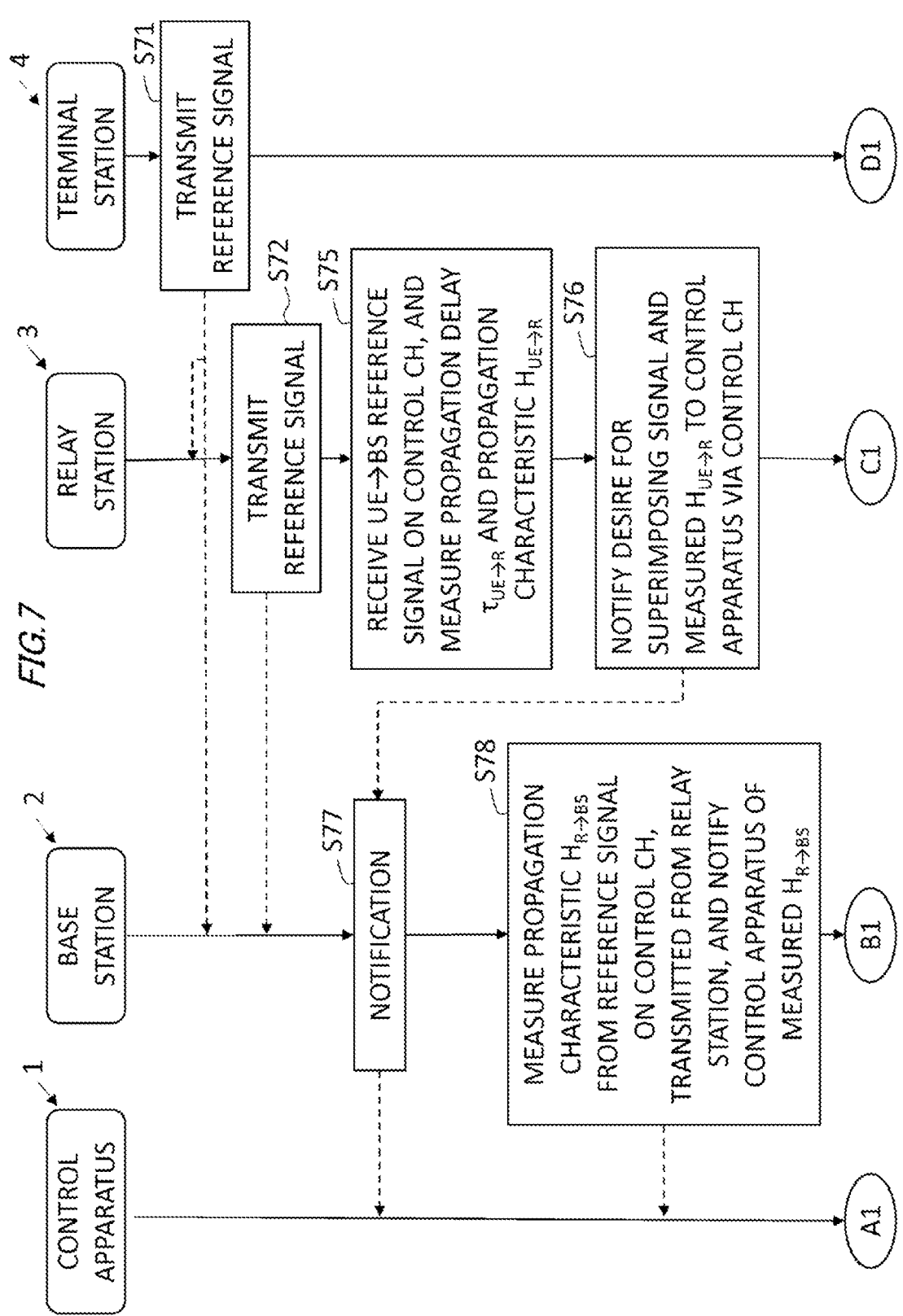
FIG. 7 is a flowchart illustrating a processing flow in the communication system.
Figure 8:
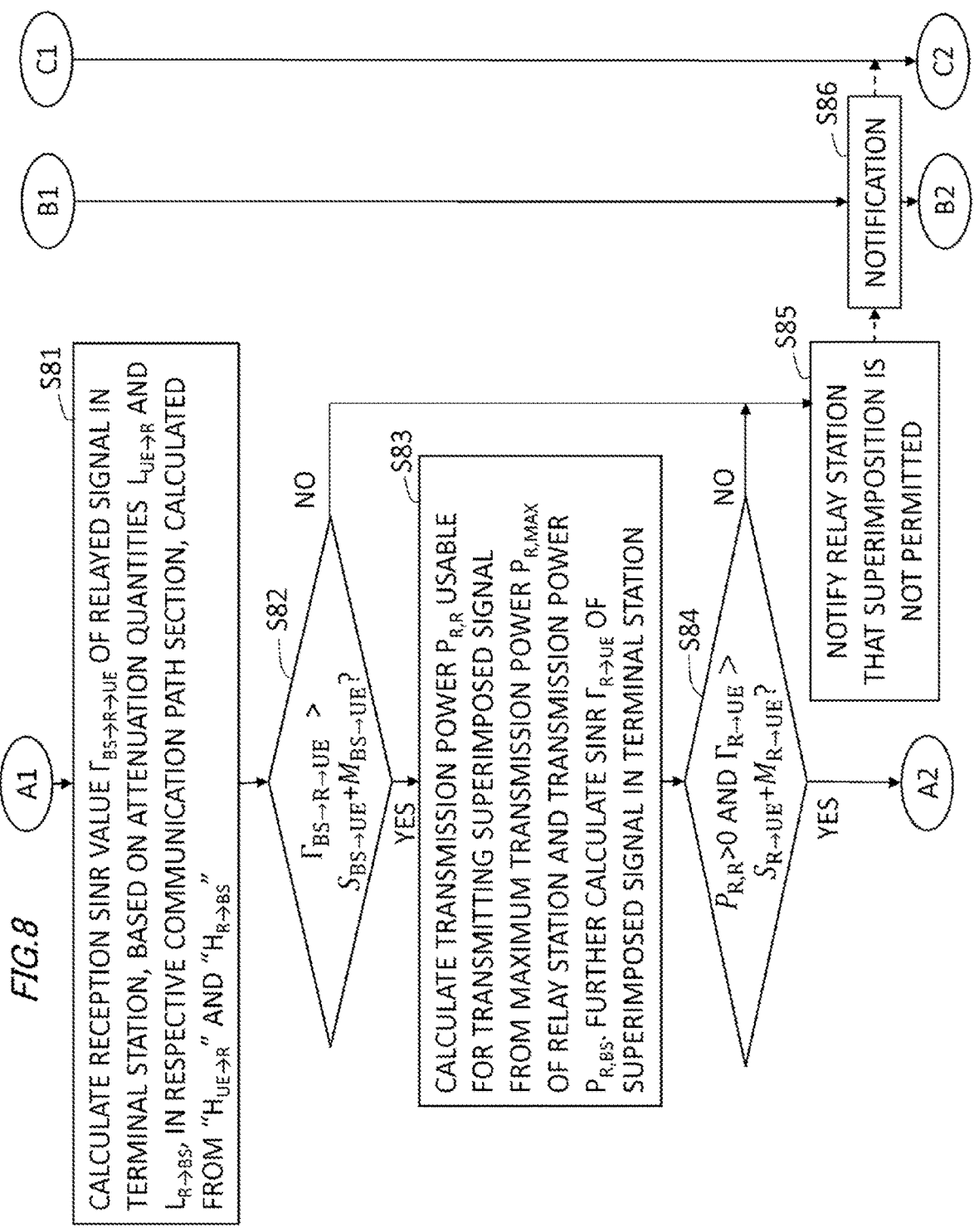
FIG. 8 is a flowchart illustrating the processing flow in the communication system.
Figure 9:
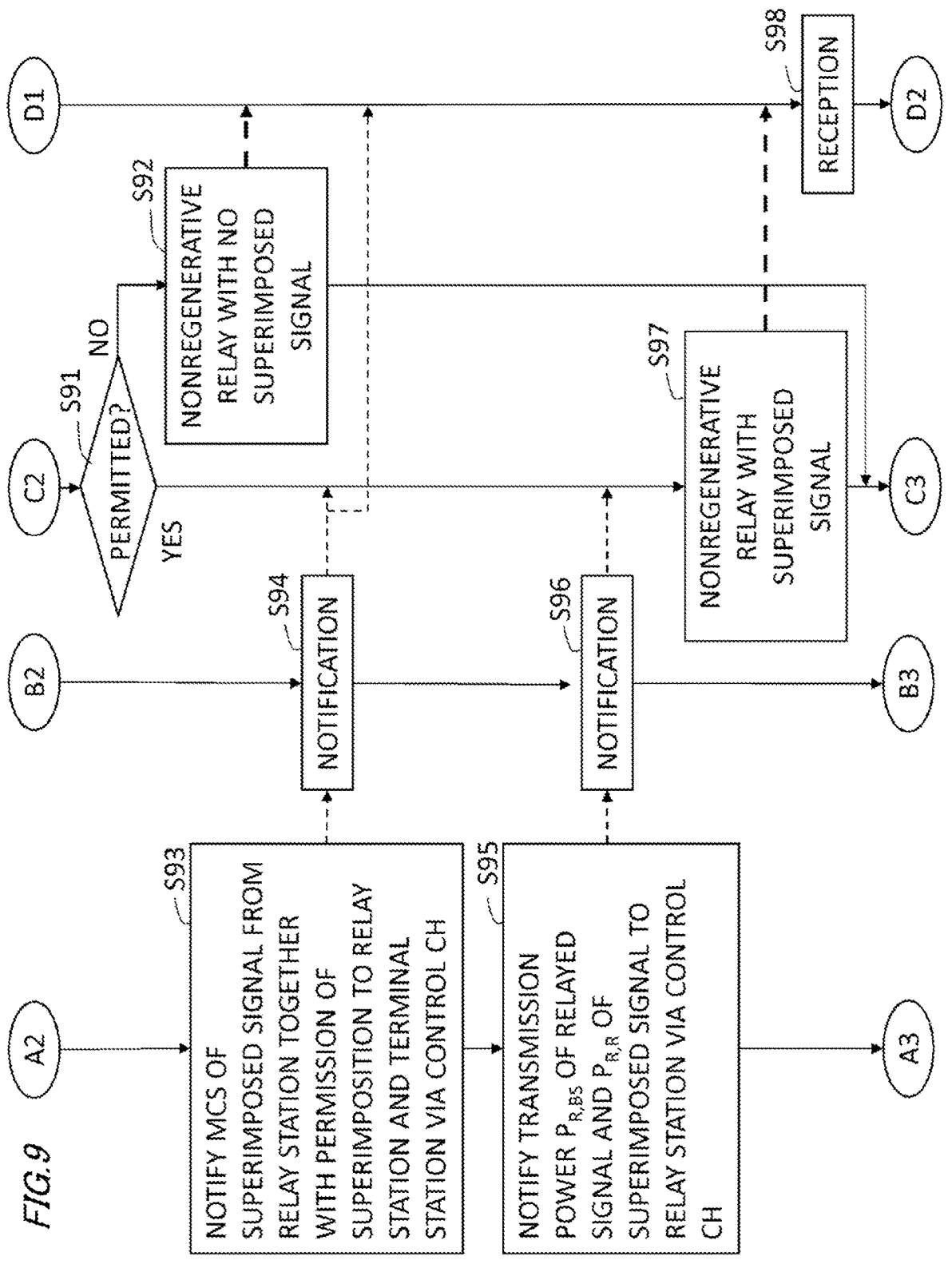
FIG. 9 is a flowchart illustrating the processing flow in the communication system.

FIGS. 7 through 9 illustrate a processing flow in the communication system 100. The processing flow in FIGS. 7 through 9 is repeated for every wireless frame. Herein, the processing flow will be described on the assumption that the base station 2 is the transmission station (first communication station), while the terminal station 4 is the reception station (second communication station). To begin with, the terminal station 4 and the relay station 3 transmit the reference signals to the base station 2 on an uplink control channel (S71, S72).

The relay station 3 receives the reference signal on the control channel from the terminal station 4 to the base station 2, and measures the propagation delay "$\tau_{UE \to R}$" and the propagation characteristic "$H_{UE \to R}$" (S75). The relay station 3 notifies a desire for signal superimposition and the measured propagation characteristic "$H_{UE \to R}$" to the control apparatus 1 through the control channel via the base station 2 (S76, S77). Herein, the relay station 3 transmits the desire for the signal superimposition to the control apparatus 1 when the request for transmitting the data to the terminal station 4 as the reception station (relayed station) occurs in the relay station 3. The base station 2 measures the propagation characteristic "$H_{R \to BS}$" from the reference signal, transmitted from the relay station 3, on the control channel, and notifies the control apparatus 1 of the measured propagation characteristic (S78). FIG. 7 is continuous to FIG. 8 with symbols A1, B1 and C1. The description continues with reference to FIG. 8. Note that a process (S71) indicated by a symbol D1 in FIG. 7 is continued to a process (S98) in FIG. 9.

The control apparatus 1 determines, based on "$H_{UE \to R}$" and "$H_{R \to BS}$", the feasibility of superimposing the signal in the relay station 3. To be specific, the control apparatus 1 calculates the attenuation quantities "$L_{UE \to R}$" and "$L_{R \to BS}$" in the respective sections of the communication path between the base station 2 and the terminal station 4. Herein, the attenuation quantity "$L_{UE \to R}$" corresponds to a loss on the propagation path between the terminal station 4 and the relay station 3. The attenuation quantity "$L_{R \to BS}$" corresponds to a loss on the propagation path between the relay station 3 and the base station 2. The control apparatus 1 calculates the reception SINR (signal-to-interference noise power ratio) "$\Gamma_{BS \to R \to UE}$" of the relayed signal in the terminal station 4 from the attenuation quantities "$L_{UE \to R}$" and "$L_{R \to BS}$" in the respective sections of the communication path (S81).

The control apparatus 1 determines whether the reception SINR "$\Gamma_{BS \to R \to UE}$" in the terminal station 4 is equal to or larger than the SINR value "$S_{BS \to UE}$" required by the MCS in the communications between the base station 2 and the terminal station 4 with respect to the transmission signal coming from the base station 2 (S82). When determined to be YES in S82, the control apparatus 1 obtains the desired transmission power "$P_{R,BS}$" of the relay wave to be relayed in the relay station 3, which is necessary for being determined YES in S82. Hereat, the control apparatus 1 may set the margin "$M_{BS \to UE}$" in the terminal station 4 (refer to (Formula 4)). In other words, the control apparatus 1 may set the desired SINR in the terminal station 4 to "$S_{BS \to UE} + M_{BS \to UE}$".

Next, the control apparatus 1 calculates the transmission power "$P_{R,R} = 10 \log_{10}(10^{\wedge}(P/10) - 10^{\wedge}(P_{R,BS}/10))$" usable for transmitting the superimposed signal from the maximum transmission power "$P_{R,max}$" in the relay station 3 and the transmission power "$P_{R,BS}$" of the relay wave (refer to (Formula 3)). With "$P_{R,R}$" taking a positive value, the control apparatus 1 obtains the reception SINR "$\Gamma_{R \to UE}$" in the terminal station 4 when the relay station 3 transmits the superimposed wave with the transmission power "$P_{R,R}$" (S83). The control apparatus 1 determines whether there is the communication-enabled MCS with the reception SINR $\Gamma_{R \to UE}$ (S84). Specifically, the control apparatus 1 calculates transmission power "$P_{R,R}$" in the relay station 3 usable for the communications in response to the communication request by eliminating the transmission power "$P_{R,BS}$" for relaying the communications out of the maximum transmission power "$P_{R,max}$" as the maximum relay power allowable to the relay station 3. The control apparatus 1 determines whether there are the communication-enabled modulation method and the coding rate (MCS) with the reception SINR "$\Gamma_{R \to UE}$" of the superimposed signal in the terminal station 4 when the transmission power "$P_{R,R}$" takes the positive value.

When determined to be NO in S84, the control apparatus 1 does not permit the relay station 3 to perform the superimposition. Consequently, the control apparatus 1 notifies the relay station 3 via the base station 2 that the relay station 3 is not permitted to perform the superimposition (S85, S86). Next, FIG. 8 is continued to FIG. 9 by symbols A2, B2, C2. Note that the symbol D1 in FIG. 7 is continued to FIG. 9. The description will hereinafter continue with reference to FIG. 9. When not permitted to perform the superimposition (NO in S91), the relay station 3 nonregenerative-relays the relayed signal without the superimposed signal (S92).

Whereas when determined YES in S84, the control apparatus 1 permits the relay station 3 to superimpose the superimposed wave on the relay wave. Herein, the desired SINR of the MCS is set to "$S_{R \to UE}$" (refer to (Formula 4)), and, however, the control apparatus 1 may make the decision by adding the margin "$M_{R \to UE}$" to the desired SINR (refer to (Formula 5)). When determining that the superimposition is permitted, the control apparatus 1 notifies the MCS of the superimposed wave to be superimposed on the relay wave in the relay station 3 together with the permission of the superimposition to the relay station 3 and the terminal station 4 via the control channel from the base station 2 (S93, S94). The control apparatus 1 notifies the transmission power "$P_{R,BS}$" of the relay wave and the transmission power "$P_{R,R}$" of the superimposed wave to the relay station 3 via the control channel from the base station 2 (S95, S96).

The relay station 3 permitted to perform the superimposition sets an amplitude of the waveform of the baseband signal after passing through the FIR filter so that average power of the relay waves becomes "$P_{R,BS}$". With respect to the superimposed signal, the relay station 3 generates, based on the designated MCS, the signal having the baseband waveform, and adjusts the amplitude of the baseband signal so that the average power of the superimposed waves becomes "$P_{R,R}$". The relay station 3 adds the relay wave and the superimposed wave to the signal having the baseband waveform to convert this signal into the high-frequency signal and transmits the high-frequency signal (S97). The relay station 3 thereby nonregenerative-relays the relay wave concurrently with the transmission of the superimposed wave.

The terminal station 4 receives the data from the respective stations by using a process exemplified by interference cancellation to successively separate a variety of superimposed signals (S98).

Effects of Embodiment

In the embodiment, the relay station 3 nonregenerative-relays the transmission signal from the base station 2 (or the terminal station 4) serving as the transmission station without changing the timeslot in the communications based on the Time Division Multiplexing (TDM). When the request for transmitting the data to the terminal station 4 (or the base station 2) as the reception station (relayed station) occurs in the relay station 3, the relay station 3 notifies the control apparatus 1 of the desire for the signal superimposition and the propagation characteristic "$H_{UE \to R}$" measured by the relay station 3 between the reception station (e.g., the terminal station 4) and the relay station 3. The transmission station (e.g., the base station 2) measures the propagation characteristic "$H_{R \to BS}$" between the base station 2 and the relay station 3, and notifies the control apparatus 1 of the measured characteristic. Then, the control apparatus 1 determines, as the first condition, whether the reception SINR "$T_{BS \to R \to UE}$" in the reception station (terminal station 4) is equal to or larger than the SINR value "$S_{BS \to UE}$" required by the MCS in the communications between the transmission station (base station 2) and the reception station (terminal station 4) with respect to the transmission signal coming from the transmission station (e.g., the base station 2). Alternatively, the control apparatus 1 determines the transmission power "$P_{R,BS}$" of the relay wave so that the determination results in YES (affirmative result), i.e., so as to fulfill the first condition. Next, the control apparatus 1 calculates the transmission power "$P_{R,R}$=10 $\log_{10}(10^{\wedge}(P_{R,max}/10)-10^{\wedge}(P_{R,BS}/10))$" usable for transmitting the superimposed signal from the maximum transmission power "$P_{R,max}$" in the relay station 3 and the transmission power "$P_{R,BS}$" of the relay wave. The transmission power "$P_{R,R}$" usable for transmitting the superimposed signal takes the positive value, and there exists the communication-enabled MCS satisfying the reception SINR "$T_{R \to UE}$" of the superimposed signal in the terminal station 4, in which case the control apparatus 1 permits the relay station 3 to superimpose the superimposed wave on the relay wave. The control apparatus 1 notifies the relay station 3 and the terminal station 4 of the MCS of the superimposed wave superimposed on the relay wave in the relay station 3 together with the permission of the superimposition. The control apparatus 1 further notifies the relay station 3 of the transmission power "$P_{R,BS}$" of the relay wave and the transmission power "$P_{R,R}$" of the superimposed wave.

Accordingly, the control apparatus 1, to start with, determines the transmission power "$P_{R,BS}$" of the relay wave in the relay station 3 so as to enable the reception station (e.g., the terminal station 4) to receive the relay wave by the nonregenerative relay. This is the first condition. Next, the control apparatus 1 calculates the transmission power "$P_{R,R}$=10 $\log_{10}(10^{\wedge}(P_{R,max}/10)-10^{\wedge}(P_{R,BS}/10))$" usable for transmitting the superimposed signal from the maximum transmission power "$P_{R,max}$" in the relay station 3 and the transmission power "$P_{R,BS}$" of the relay wave. The control apparatus 1 determines whether there are the communication-enabled modulation method and the coding rate (MCS) with the reception SINR "$T_{R \to UE}$" of the superimposed wave in the reception station (terminal station 4), which is transmitted from the relay station 3 with the transmission power "$P_{R,R}$" usable for transmitting the superimposed signal. The relay station 3 is thereby enabled to transmit the superimposed wave in response to the transmission request occurring in the relay station 3 while superimposing the superimposed wave on the relay wave by providing the superimposed wave with the sufficient power so that the superimposed wave is separable from, e.g., the relay wave. The determinations made so far by the control apparatus 1 and the superimposition of the superimposed wave on the relay wave in the relay station 3 are carried out in repetitions of the wireless frames. In other words, the relay station 3 is enabled to carry out the nonregenerative relay and to superimpose the superimposed wave on the relay wave within a range not to shift the timeslot of the relay wave.

Hereat, as described above, the control apparatus 1 determines whether the reception SINR "$T_{BS \to R \to UE}$" of the relay wave in the terminal station 4, which is relayed by the relay station 3, is equal to or larger than the SINR value "$S_{BS \to UE}$" required by the MCS in the communications between the base station 2 and the terminal station 4. The control apparatus 1 is thereby enabled to permit the relay station 3 to superimpose the superimposed wave within such a limit as to enable the terminal station 4 (or the base station 2) serving as the reception station to receive the transmission signal coming from the base station 2 (or the terminal station 4) serving as the transmission station after being nonregenerative-relayed by the relay station 3.

The control apparatus 1 permits the relay station 3 to superimpose the superimposed wave on the relay wave when the transmission power "$P_{R,R}$" usable for transmitting the superimposed signal takes the positive value with respect to the superimposed wave to be superimposed by the relay station 3, and when there exists the communication-enabled MCS satisfying the reception SINR "$T_{R \to UE}$" of the superimposed signal in the terminal station 4. The control apparatus 1 is therefore enabled to permit the relay station 3 to superimpose the superimposed wave within such a limit as to enable the terminal station 4 (or the base station 2) serving as the reception station to receive the superimposed wave.

At this time, the control apparatus 1 notifies the relay station 3 of the transmission power usable for the superimposed wave in the relay station 3, whereby the relay station 3 is enabled to transmit the superimposed wave with the proper power under the control of the control apparatus 1. Hereat, the control apparatus 1 notifies the communication-enabled MCS satisfying the reception SINR of the superimposed signal in the terminal station 4 to the relay station 3 and the terminal station 4 (or the base station 2) as the reception station. The relay station 3 and the reception station are therefore enabled to receive the relay wave and the superimposed wave, which have the reception power difference making the relay wave and the superimposed wave separable in the reception station.

OTHER EMBODIMENTS

The embodiment describes the processes of the communication system 100, in which the base station 2 operates as the transmission station, while the terminal station 4 operates as the reception station. However, the same processes of the communication system 100 are applied when the terminal station 4 operates as the transmission station, and the base station 2 operates as the reception station. Namely, the control apparatus 1 requests that the reception SINR of the relay wave is equal to or larger than the SINR value required by the MCS of the reception signal in the base station 2 as the reception station. Now, the SINR value required by the MCS is to be "$S_{UE \to BS}$". The total of the transmission power "$P_{R,R}$" of the superimposed signal and the transmission power "$P_{R,\ BS}$" of the relay wave needs to be equal to or smaller than the maximum transmission power "$P_{R,max}$" of the relay station 3. Such being the case, (Formula 3) is required. This point is the same as in the embodiment described above. It is further required that the superimposed signal passes through the propagation path having the attenuation quantity "$L_{R \to BS}$" and reaches the reception side (base station 2), and the communication-enabled MCS exists in the SINR of the signal to be received. Accordingly, the same conditions as those in (Formula 1) through (Formula 5) in the embodiment are required also when the terminal station 4 operates as the transmission station, and the base station 2 operates as the reception station. However, the terminal station 4 operates as the transmission station, and the base station 2 operates as the reception station, in which case the suffixes "BS" and "UE" are exchanged in (Formula 1) through (Formula 5).

Therefore, the control apparatus 1 may simply make the same decisions as those in S82 and S84 in FIG. 8 with respect to the reception SINR of the relay wave and the reception SINR of the superimposed signal, in which the base station 2 operates as the reception station. In the same decision as in S84, the control apparatus 1, when permitting the relay station 3 to perform the superimposition, may simply notify the MCS of the superimposed signal to be superimposed on the relay signal in the relay station 3 to the base station 2 and the relay station 3 via the base station 2 in the same procedure as in S93. The control apparatus 1 may simply notify the transmission power "$P_{R,\ BS}$" of the relayed signal and the transmission power "$P_{R,R}$" of the superimposed signal to the relay station 3 from the base station 2 via the control channel.

When the relay station 3 has a plurality of antennas, the relay station 3 is also enabled to obtain a diversity effect by changing the transmission timing for every antenna. However, the relay station 3 sets the time when reaching the reception station (e.g., the terminal station 4) not to exceed the cyclic prefix length defined as the allowable propagation delay. To be specific, with respect to the relay signal and the signal superimposed on the relay signal, the relay station 3 transmits the relay signal and the signal superimposed on the relay signal from the plurality of antennas not to cause a shift of the timeslot of the reception signal received from the transmission station (e.g., the base station 2).

In the above-described embodiment, as described with reference to FIG. 7, the relay station 3 notifies a desire for signal superposition and the measured propagation characteristic "$H_{UE \to R}$" to the control apparatus 1 through the control channel via the base station 2 (S76, S77). Here, the desire for the signal superimposition is a request of the relay station 3 to transmit data to the terminal station 4 which is the receiving station (relayed station). However, the configuration of the present embodiment is not limited to such processing. Even when a request to transmit data to another communication station (hereinafter referred to as a third communication station UE5) other than the terminal station 4 which is a receiving station (relayed station) occurs in the relay station 3, the relay station 3 may execute the same processing as in FIGS. 7 to 9. First, it is not needed to say that (Formula 1) or (Formula 2), i.e., the first condition, is requested for the relay wave from the relay station 3.

Next, the second condition is as follows. In this case, the receiving destination of the relay wave relayed in the relay station 3 is the terminal station 4, and the receiving destination of the superimposed wave carrying the signal (superimposed signal) of the data generated in the relay station 3 is the third communication station UE5. Therefore, for the superimposed wave transmitted from the relay station 3, it is sufficient that there is a communicable MCS that satisfies the above-mentioned (Formula 4) or (Formula 5) in the reception by the other communication station UE5. However, since the third communication station UE5 is not a relay target of the relay station 3, the base station 2 (or the control device 1) usually does not notify the relay station 3 of the timing at which the third communication station UE5 transmits a reference signal required for measurement of the propagation characteristic "$H_{R \to UE5}$".

Therefore, in order to expand and apply the processing of FIGS. 7 to 9 to the third communication station UE5, the following processing is performed.

(1) The base station 2 (or the control device 1) notifies the relay station 3 of the timing at which a station serving as a candidate of the third communication station UE5 transmits a reference signal.

(2) When there is a station to which the relay station 3 wants to transmit the superimposed signal among the candidate stations, the relay station 3 sets the station as a third communication station UE5. Then, the relay station 3 receives the reference signal from the third communication station UE5 and measures the propagation characteristic "$H_{R \to UE5}$" at the timing notified from the base station 2 (or the control device 1).

(3) The relay station 3 calculates the attenuation quantity "$L_{UE5 \to R}$" from the relay station 3 to the third communication station UE5 based on the measured propagation characteristic "$H_{R \to UE5}$".

(4) It is assumed that the superimposed wave transmitted from the relay station 3 at the transmission power $P_{R,R}$ passes through the propagation path of the attenuation quantity "$L_{UE5 \to R}$" and reaches the receiving side (the third communication station UE5), and the SINR of the received signal is equal to "$T_{R \to UE5}$". Here, $P_{R,R}$ is a value satisfying Formula 3. Then, the second condition is that there is a communicable MCS for the SINR of the superimposed signal, i.e., "$T_{R \to UE5}$". In other words, in (Formula 4) or (Formula 5), a similar condition is requested for "$T_{R \to UE5}$" instead of "$T_{R \to UE5}$". However, as in FIG. 6, the SINR of the received signal of the superimposed wave (superimposed signal), i.e., "$T_{R \to UE5}$" is a value defined by the base level of "$T_{BS \to R \to UE}$", i.e., the SINR of the relay wave (relayed signal) at the receiving station (e.g., terminal station 4). This is because both the terminal station 4 and the third communication station UE5 are considered to be receiving stations located in a range in which received waves of the receiving stations can be relayed by the relay station 3. Therefore, it is assumed that the reception power of the terminal station 4 affects the reception signal of the third communication station UE5. Therefore, it is desirable that the SINR of the signal received by the third communication station UE5 is set to the value defined by the base level of the SINR of the terminal station 4. By such processing, even when a request to transmit data to another communication station (third communication station UE5) other than the terminal station 4 which is the receiving station (relayed station) occurs in the relay station 3, the second condition can be accurately determined in the same manner as the transmission to the terminal station 4 which is the relayed station. Here, the second condition is that there is a communicable MCS for the SINR of the superimposed signal, i.e., "$T_{R \to UE5}$".

As described above, even when a request to transmit data to the third communication station UE5 other than the terminal station 4 which is the receiving station (relayed station) occurs in the relay station 3, the communication system 100A or 100B can execute the same processing as in FIGS. 7 to 9. That is, the relay station 3 can also transmit the superimposed wave based on the transmission request generated by the relay station 3 to the third communication station UE5.

The processes described as being executed by one apparatus may also be executed by a plurality of apparatuses by sharing the processes. None of problems may be caused alternatively when the processes described as being performed by the different apparatuses are executed by one apparatus. In a computer system, a method of how respective functions are attained by what type of hardware configuration (server configuration) may be flexibly varied.

In the embodiment discussed above, the control apparatus 1 is the apparatus on the core network to which the base station 2 is connected. Alternatively, the control apparatus 1 is the core network itself or the system contained in the core network. It does not, however, mean that the control apparatus 1 is limited to the apparatus configured as such on the core network. For example, the control apparatus 1 may also be the apparatus included in the base station 2. For instance, the control apparatus 1 may be the apparatus performing the communications with the relay station 3 or the terminal station 4 via the wireless equipment 21 within the base station 2. In this case, the control apparatus 1 and the base station 2 may be configured as an integrated apparatus to simply execute the processes in FIGS. 7 through 9. Accordingly, the processes illustrated as biserial sequences made by A1, B1, A2, B2, A3, and B3 may be configured into a uniserial sequence.

The present disclosure is attainable also by supplying the computer with computer programs implementing the functions described in the embodiment and making one or more processors included in the computer read and execute the programs. The computer may be provided with the computer programs functioning as such by using a non-transitory computer readable storage medium connectible to a system bus of the computer, or through the network. The non-transitory computer readable storage medium includes: e.g., an arbitrary type of disc exemplified by a magnetic disc (Floppy disc (registered trademark), a hard disc drive (HDD)), and optical discs (CD-ROM, DVD disc, and Blu-ray disc); and an arbitrary type of medium suited to storing electronic instructions, which medium is exemplified by a Read Only Memory (ROM); a Random Access Memory (RAM), an Erasable Programmable ROM (EPROM), an Electrically Erasable Programmable ROM (EEPROM), a magnetic card, a flash memory, or an optical card.

What is claimed is:

1. A communication system comprising:
a first communication station;
a second communication station;
a relay station to relay a communication between the first communication station and the second communication station without changing a timeslot of the communication based on Time Division Multiplexing; and
a control apparatus including a processor and a memory storing instructions executable by the processor, the processor being configured, based on the instructions, to permit the relay station to perform a further communication in response to a communication request occurring in the relay station while relaying the communication, the further communication being directed to a third communication station when the communication to be relayed fulfill a first condition and when the further communication in response to the communication request fulfill a second condition.

2. The communication system according to claim 1, wherein the first condition is that a signal-to-interference noise power ratio of a reception signal in the second communication station is equal to or larger than a reference signal-to-interference noise power ratio required for a modulation method and a coding rate of the reception signal in the communication to be relayed.

3. The communication system according to claim 1, wherein the second condition is that remained transmission power usable in the relay station usable for the further communication in response to the communication request takes a positive value, the remained transmission power being obtained by eliminating transmission power of the communication to be relayed from a maximum transmission power allowable to the relay station, and that there exist a communication-enabled modulation method and a coding rate at a signal-to-interference noise power ratio calculated with respect to the reception signal in the third communication station for the further communication in response to the communication request.

4. The communication system according to claim 3, wherein the control apparatus-processor notifies the relay station of transmission power fulfilling the second condition and being usable for the further communication in response to the communication request.

5. The communication system according to claim 3, wherein the control apparatus-processor notifies the modulation method and the coding rate that fulfill the second condition to the relay station and the third communication station.

6. The communication system according to claim 1, wherein the control apparatus processor is included in the first communication station, the second communication station, or the third communication station.

7. A control apparatus comprising:
a processor; and
a main storage device, the control apparatus controlling a first communication station, a second communication station and a relay station to relay a communication without changing a timeslot of the communication based on Time Division Multiplexing between the first communication station and the second communication station, and permitting the relay station to perform a further communication in response to a communication request occurring in the relay station while relaying the communication, the further communication being directed to a third communication station when the communication to be relayed fulfill a first condition and when the further communication in response to the communication request fulfill a second condition.

8. The control apparatus according to claim 7, wherein the first condition is that a signal-to-interference noise power ratio of a reception signal in the second communication station is equal to or larger than a reference signal-to-interference noise power ratio required for a modulation method and a coding rate of the reception signal in the communication to be relayed.

9. The control apparatus according to claim 7, wherein the second condition is that remained transmission power usable in the relay station usable for the further communication in response to the communication request takes a positive value, the remained transmission power being obtained by eliminating transmission power of the communication to be relayed from a maximum transmission power allowable to the relay station, and that there exist a communication-enabled modulation method and a coding rate at a signal-to-interference noise power ratio calculated with respect to the reception signal in the third communication station for the further communication in response to the communication request.

10. The control apparatus according to claim 9, wherein the control apparatus notifies the relay station of transmission power fulfilling the second condition and being usable for the further communication in response to the communication request.

11. The control apparatus according to claim 9, wherein the control apparatus notifies the modulation method and the coding rate that fulfill the second condition to the relay station and the third communication station.

12. The control apparatus according to claim 7, wherein the control apparatus is included in the first communication station, the second communication station or the third communication station.

13. A communication method comprising:
causing a control apparatus to control a first communication station, a second communication station, and a relay station to relay a communication without changing a timeslot of the communication based on Time Division Multiplexing between the first communication station and the second communication station; and
causing the control apparatus to permit the relay station to perform a further communication in response to a communication request occurring in the relay station while relaying the communication, the further communication being directed to a third communication station when the communication to be relayed fulfill a first condition and when the further communication in response to the communication request fulfill a second condition.

14. The communication method according to claim 13, wherein the first condition is that a signal-to-interference noise power ratio of a reception signal in the second communication station is equal to or larger than a reference signal-to-interference noise power ratio required for a modulation method and a coding rate of the reception signal in the communication to be relayed.

15. The communication method according to claim 13, wherein the second condition is that remained transmission power usable in the relay station usable for the further communication in response to the communication request takes a positive value, the remained transmission power being obtained by eliminating transmission power of the communication to be relayed from a maximum transmission power allowable to the relay station, and that there exist a communication-enabled modulation method and a coding rate at a signal-to-interference noise power ratio calculated with respect to the reception signal in the third communication station for the further communication in response to the communication request.

16. The communication method according to claim 15, further causing the control apparatus to notify the relay station of transmission power fulfilling the second condition and being usable for the further communication in response to the communication request.

17. The communication method according to claim 15, further causing the control apparatus to notify the modulation method and the coding rate that fulfill the second condition to the relay station and the third communication station.

18. The communication method according to claim 13, wherein the control apparatus is included in the first communication station, the second communication station or the third communication station.

19. The communication method according to claim 13, wherein the third communication station is same as the second communication.

* * * * *